Dec. 7, 1948. R. A. MacGREGOR 2,455,431
ENGINE MOUNTING AND DRIVE WHEEL
SUSPENSION FOR MOTORCYCLES
Filed March 22, 1946

Inventor
ROBERT A. MAC GREGOR,

Attorneys

Patented Dec. 7, 1948

2,455,431

UNITED STATES PATENT OFFICE 2,455,431

ENGINE MOUNTING AND DRIVE WHEEL SUSPENSION FOR MOTORCYCLES

Robert A. MacGregor, Olney, Ill.

Application March 22, 1946, Serial No. 656,252

3 Claims. (Cl. 180—33)

My invention relates generally to improvements in motorcycle drive wheel suspension, and more particularly to an improved construction of this type wherein the final drive of the power plant and the drive are directly connected through gearing and can move together relative to the vehicle frame in accommodating irregularities of the road surface, under two-way control of road shock and rebound absorbing means.

The primary object of my invention is to provide an improved construction of the character indicated which will provide a greater than usual amplitude of drive wheel movement to assure smooth riding and maximum contact between the drive wheel and the road surface, thereby substantially increasing the comfort, roadability, and safety of the vehicle, while eliminating the complicated linkage and the number of exposed parts heretofore employed in an effort toward providing for sufficient amplitude of drive wheel movement.

Another important object of my invention is to provide an improved construction of the type indicated wherein the power plant, including the engine, transmission, drive shaft, drive shaft housing, and drive wheel may be made a single complete enclosed unit, eliminating exposure of working parts and enabling better support and lubrication thereof, thereby greatly increasing their operating efficiency and useful life.

Further important objects and advantages of my invention will be apparent in the following description and appended drawing, wherein for the purposes of illustration only, a preferred embodiment is set forth in detail.

Figure 1:
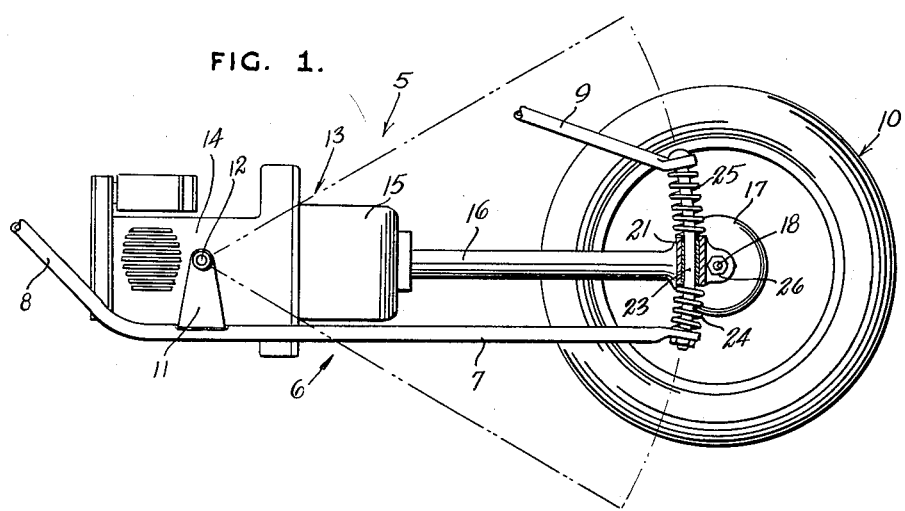
Figure 1 is a fragmentary side elevation, partly in section, showing application of my invention to a motorcycle or like vehicle.
Figure 2:
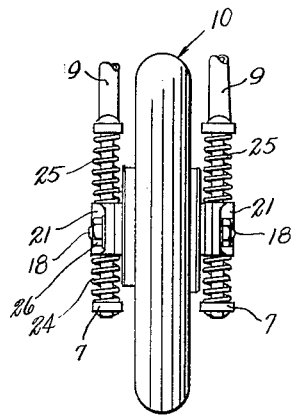
Figure 2 is a fragmentary end elevation, looking from right to left in Figure 1.
Figure 3:
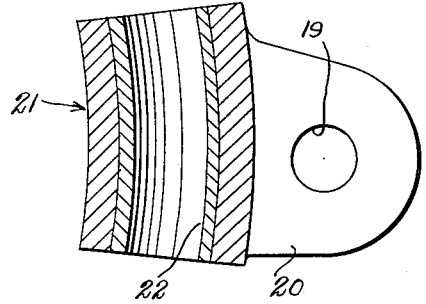
Figure 3 is a vertical longitudinal section on an enlarged scale taken through the slipper block.

Referring in detail to the drawing, the numeral 5 generally designates the motorcycle selected to illustrate the principles of my invention. The frame of the motorcycle comprises the lower frame member 6, having the generally horizontal parts 7 and the forward upwardly angulated parts 8 which connect with the steering post support (not shown) which may be of conventional design; and the declining upper rear frame member 9. As indicated in Figure 2 of the drawing, in the present case the parts 7 and 9 are duplicated on opposite sides of the drive wheel 10.

The forward portion of the lower frame member part 7 has rigidly mounted thereon the U-shaped trunnion 11 whose arms have horizontal transverse pivots 12 supporting the power plant, generally designated 13.

The integrated, unitary power plant 13 comprises the engine 14 and its casing, to which the pivots 12 are connected, the transmission casing 15 which may be integral with the engine casing, the drive shaft housing 16, which may be integral with the transmission casing, and the drive gear housing 17 on the rear end of the drive shaft housing. The drive gear housing 17 encloses a suitable gear drive (not shown) between the drive shaft (not shown) and the drive wheel 10.

The drive gear housing 17 has axial stub shafts 18 projecting from its opposite sides which are received in holes 19 in rearwardly projecting ears 20 on slipper blocks 21 in conjunction with holding means such as nuts 26. The slipper blocks 21 have suitably curved bores, lined with bearing sleeves 22, which slide freely upon curved slipper rods 23, which are fixed at top and bottom to the rear ends of the upper and lower frame member parts 9 and 7, respectively.

The curvature of the slipper rods 23 and slipper blocks 21 corresponds to segments of a circle having its center coincidental with the axis of the pivots 12.

On the slipper rods 23 between the lower frame part 7 and the bottom of the slipper blocks 21 are helical buffer springs 24, while load carrying helical springs 25 are circumposed on the slipper rods 23 between the tops of the slipper blocks 21 and the upper frame member parts 9. It is obvious that the slipper rods 23, the slipper blocks 21, and the springs can be so proportioned as to permit the drive wheel 10 any desired amplitude of vertical movement relative to the vehicle frame 6 on the axis of the stationary pivots 12, and that this movement may in actual construction be made greater and more uniform than has heretofore been practicable.

I claim:

1. A motorcycle, comprising an upper and a lower frame member, a unitary power plant including a drive wheel having its axis positioned between said frame members adjacent the rear ends of said frame members, an engine having a drive shaft extending therefrom and gear means directly connecting the outer end of the drive shaft with said drive wheel, a housing carrying said drive wheel and enclosing said engine, drive shaft, and gear means, and holding said engine, drive shaft, gear means, and drive wheel rigidly relative to one another, a horizontal transverse pivot in the same horizontal plane as the drive shaft and connected to said power plant at a point remote from the outer end of the drive shaft whereby said power plant can swing as a unit in a vertical plane relative to the motorcycle frame, and a guide connected between the said upper and lower frame members adjacent the rear ends thereof and effectively connected to said housing, for guiding and cushioning the movement of said power plant on the axis of said pivot as said drive wheel rises and falls in response to inequalities in a road surface.

2. A motorcycle, comprising an upper and a lower frame member, a unitary power plant including a drive wheel having its axis positioned between said frame members adjacent the rear ends of said frame members, an engine having a drive shaft extending therefrom and gear means directly connecting the outer end of the drive shaft with said drive wheel, a housing carrying said drive wheel and enclosing said engine, drive shaft, and gear means, and holding said engine, drive shaft, gear means, and drive wheel rigidly relative to one another, a horizontal transverse pivot connected to said power plant at a point remote from the outer end of the drive shaft whereby said power plant can swing as a unit in a vertical plane relative to the motorcycle frame, and guide means connected between the said upper and lower frame members adjacent the said ends thereof and effectively connected to said housing, for guiding and cushioning swinging of said power plant on the axis of said pivot as said drive wheel rises and falls in response to inequalities in a road surface, said guide means comprising an arcuate slip rod on one side of said drive wheel, a slip block slidable along the slip rod, and means connecting said slip block to said housing.

3. A motorcycle, comprising an upper and lower frame member, a unitary power plant including a drive wheel having its axis positioned between said frame members adjacent the rear ends of said frame members, an engine having a drive shaft extending therefrom and gear means directly connecting the outer end of the drive shaft with said drive wheel, a housing carrying said drive wheel and enclosing said engine, drive shaft, and gear means, and holding said engine, drive shaft, gear means, and drive wheel rigidly relative to one another, a horizontal transverse pivot connected to said power plant at a point remote from the outer end of the drive shaft whereby said power plant can swing as a unit in a vertical plane relative to the motorcycle frame, and guide means connected between the said upper and lower frame members adjacent to the rear ends thereof and effectively connected to said housing, for guiding and cushioning swinging of said power plant on the axis of said pivot as said drive wheel rises and falls in response to inequalities in a road surface, said guide means comprising a pair of arcuate slip rods at opposite sides of said drive wheel, a pair of slip blocks connected to said housing and slidable along said slip rods, and load absorbing and rebound checking means acting between each slip block and the upper and lower frame members at each side of the drive wheel, for controlling the rise and fall of the drive wheel, said rebound checking means and load absorbing means comprising helical springs circumposed on the slip rods between said frame members and the corresponding ends of the slip blocks.

ROBERT A. MacGREGOR.

REFERENCES CITED

The following references are of record in the file of this patent:

UNITED STATES PATENTS

| Number | Name | Date |
|---|---|---|
| 1,148,707 | Morley | Aug. 3, 1915 |
| 1,651,153 | Reilly | Nov. 29, 1927 |
| 2,227,379 | Quartullo | Dec. 31, 1940 |

FOREIGN PATENTS

| Number | Country | Date |
|---|---|---|
| 586,774 | France | Jan. 9, 1925 |
| 589,755 | France | Feb. 27, 1925 |